Nov. 10, 1936.  M. B. BUTLER, JR., ET AL  2,060,608
DOOR CONSTRUCTION
Filed Aug. 21, 1934
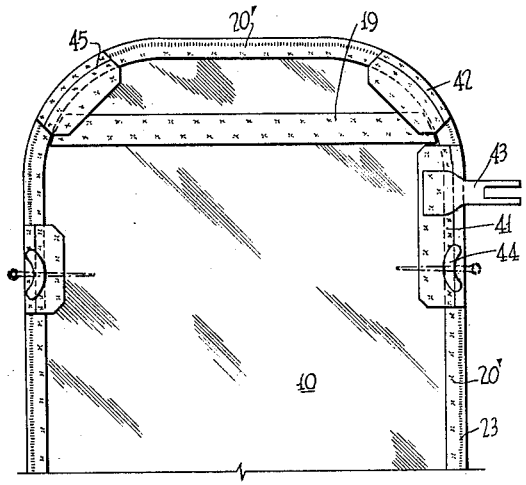
FIG.1
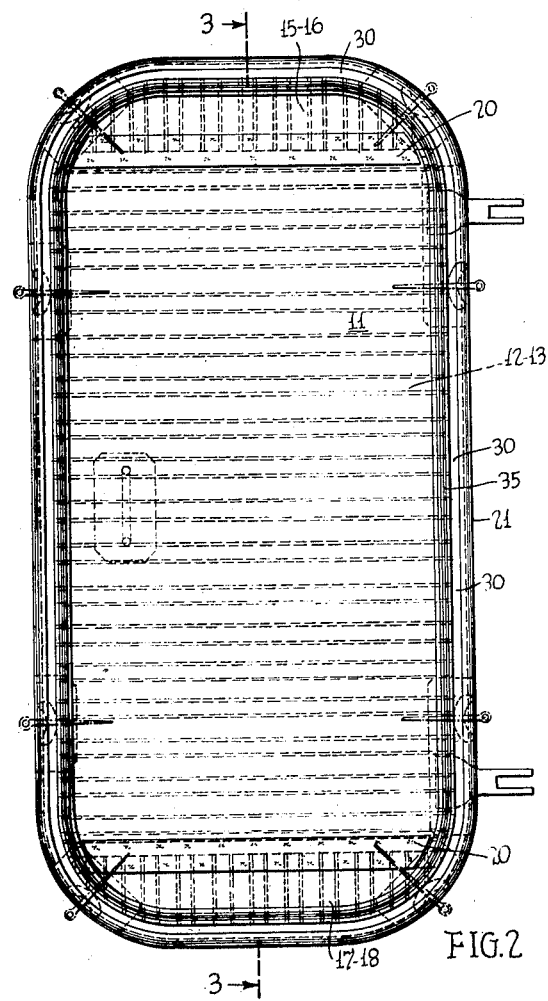
FIG.2
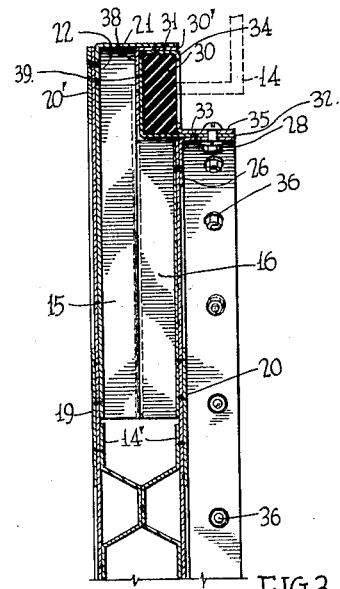
FIG.3
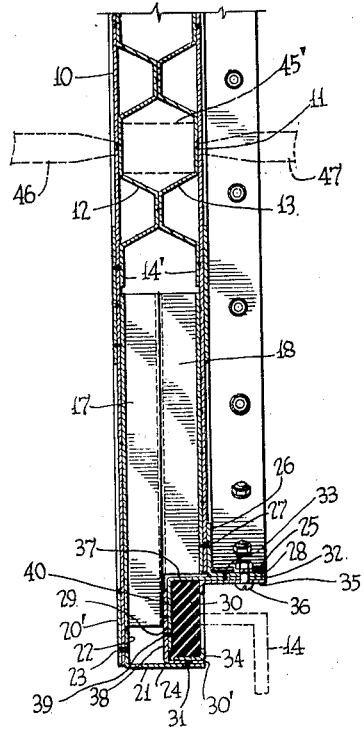
INVENTORS
Marcus B. Butler Jr
Charles B. Conwell
BY John P. Tarbox
ATTORNEY.

Patented Nov. 10, 1936

2,060,608

UNITED STATES PATENT OFFICE 2,060,608

DOOR CONSTRUCTION

Marcus B. Butler, Jr., and Charles B. Conwell, Philadelphia, Pa., assignors to Edward G. Budd Manufacturing Company, Philadelphia, Pa., a corporation of Pennsylvania Application August 21, 1934, Serial No. 740,744

12 Claims. (Cl. 189—46)

The invention relates to door constructions and particularly such door constructions as are usable in doors for ships' bulkheads and the like.

It is the main object of the invention to provide a door of this class which is very much lighter in weight than the usual door of this class yet of sufficient strength to withstand the heavy pressures to which such doors are subjected.

Other objects of the invention are the construction of such a door so as to facilitate the assembly thereof by spot and seam welding so as to produce a water-tight construction.

These objects are attained according to the invention by constructing the main body of the door out of relatively light gauge material of high tensile strength such as stainless steel, the body of the door being of hollow construction including continuous flat plates forming the inner and outer walls thereof, said plates being spaced by spacing and reinforcing means between the walls which may be in the form of corrugated plates secured together in their overlapping corrugations and to the outer side wall plates to form therewith a very rigid cellular structure. According to the invention, the reinforcing plates adjacent the outer face of the door are utilized to reinforce the edge channel adapted to receive the rubber gasket usually used in this type of construction to form a water-tight joint between the edge of the door and its frame. This reinforced edge construction, according to the invention, is especially organized to facilitate its assembly with the edges of the flat plates forming the opposite side walls of the door and with the edge channel adapted to receive the gasket by water-tight joints. To this end, the edges of the plates are reinforced by continuous angles extending around the door, these angles being in turn secured to the opposite side walls of the channel adapted to receive the sealing gasket. All of the joints mentioned are readily accessible according to the present construction for formation by continuous seam welds insuring water-tightness in all the joints. The edge of the door is further reinforced by continuous flat plates extending entirely around the outer face thereof and secured to the plate forming the main body of the outer face. Additionally, in the regions where the clamping means and the hinges are applied to the outer face of the door, additional heavy gauge reinforcing plates are secured adjacent the edges of the door and in the locations where the clamping plates and hinges are secured.

The foregoing and other objects and the means by which they are attained will be apparent from the following detailed description when read in connection with the drawing forming a part of this specification.

In the drawing,

Figure 1 shows an outside elevation of one half of the length of the door according to the invention.

Figure 2 shows the full length of the door in inside elevation.

Figure 3 is a longitudinal sectional view, the section being taken substantially on the line 3—3 of Figure 2 and being shown on an enlarged scale with the central portion broken away.

According to the invention the main body of the door, which has well rounded corners, is of hollow construction and built up of an outer flat face plate 10 of an extent covering the entire outer face of the door, and an inner flat plate 11 of less extent than the outer plate with the peripheral contour similar to that of the outer plate and spaced inwardly from the periphery of the outer plate a substantially uniform distance throughout.

To reinforce and space these outer plates and to give strength to the main body of the door, transversely corrugated plates 12 and 13 are provided between the plates 10 and 11, these plates being arranged with the bottoms of their corrugations overlapping each other substantially in the medial plane of the door and securely joined together in this overlapped area by spot welding. The outer portions of these plates which overlap the plates 10 and 11 are securely spot welded through the overlapped area to these plates. The corrugations of the plates 12 and 13 are preferably formed so as to have generally rectilinear side and bottom walls, thus providing a wider overlap both between themselves and between them and the outer cover plates 10 and 11 and affording a stronger construction than would be afforded with ordinary corrugations having rounded crests and troughs.

Laterally of the door the corrugated plate 13 adjacent the inner face thereof is substantially coextensive with the periphery of the inner face plate 11. The corrugated plate 12 adjacent the outer face of the door is extended some distance beyond the corrugations adjacent the inner face of the door to reinforce the edge of the door which, when in the closed position, overlaps the upstanding flange 14 of the frame around the edge of the door indicated in dotted lines in Figure 3.

In order to provide for similar edge reinforcement and to similarly reinforce the body thereof adjacent the ends of the door the corrugated plates 12 and 13 terminate in transverse lines as indicated at 14', short of the ends of the door and from these lines to the ends of the door short longitudinally extending corrugated plates 15 and 16 at one end of the door and 17 and 18 at the other end of the door of similar configuration to the corrugated plates 12 and 13 are interposed between the side wall plates and secured thereto and to each other in a manner similar to the larger corrugated plates 12 and 13. This arrangement insures that the outer corrugated plates 15 and 17 may be extended at the ends of the doors in the same manner as the corrugated plate 12 is extended between said ends to overlap and reinforce the end portions of the door frame. By this arrangement the reinforcement secured by the outer corrugated plates arranged adjacent the outside wall 10 extends throughout substantially the entire margin of the door in a direction approximately at right angles to the margin of the door, in which direction the corrugations have their greatest resistance to bending and therefore effect the greatest reinforcement to the margin of the door.

The joint where the transverse and longitudinal corrugated plates meet is reinforced on both sides of the door by transversely extending flat plates 19 and 20 overlapping the joint and secured by spot welding to the overlapped portions of the outer cover plates and the corrugated spacing and reinforcing plates.

To reinforce the margin of the door and to provide the proper water-tight marginal construction of the door the margins of the door are constructed as follows:

A narrow marginal plate 20' is applied to the outer side of the face plate 10 around the entire periphery thereof and secured to the overlapped portions of the face plate and the corrugated plate adjacent thereto. As shown in Figure 3, both this reinforcing strip and the margin of the face plate 10 extend some distance beyond the outer edges of the corrugated plates 17 and 12. An angle 21 extending continuously around the door opening and having its end portions overlapped and secured together by a continuous transverse seam weld has its short arm 22 lapped over the double thickness of metal formed by the reinforcement 20 and the plate 10 of the margin of the plate and secured thereto to form a watertight joint by a continuous seam weld indicated at 23. The other arm of this angle designated 24 extends transversely to the body of the door to form the door edge and is of a depth substantially equal to the depth of the main body of the door. A similar angle 25 of similar extent but of smaller dimensions to conform to the periphery of the inner face plate 11 is secured through one of its arms 26, to the margin of the inner panel 11 by a continuous seam weld 27, its other arm 28 extending inwardly at right angles to the door parallel to the arm 24 of the angle 21.

By reason of this water-tight joinder between the angles 21 and 25 and their respective face plates, the angles form in effect integral extensions of these plates, and if the metal of the face plates is such as to permit forming therein a depth of flange equal to the depth of the arms 24 and 28 of the angles, it is obvious that it may be possible to form these laterally extending flanges 24 and 25 as integrally formed parts of the outer and inner cover plates 10 and 11. In the case of present construction where high tensile stainless steel cover plates are utilized, since the use of such plates permits a lighter construction, these edge flanges 24 and 28 are more conveniently formed by separate angles as shown and described.

The arm 24 and the peripheral extensions of the outer corrugated plates 17 and 12 and the peripheral portions of the inner corrugations 18 and the arm 28 extending laterally therefrom, provide a peripheral seat facing laterally of the door body, and in this seat is seated and secured a continuous laterally facing edge channel 29 which is adapted to receive within it the sealing gasket 30' which makes a water-tight joint with the edge 14 of the door frame when the door is clamped in place. This channel 29 has its outer side wall 30' overlapping the arm 24 of the angle 21 and is secured thereto to form a watertight joint by a continuous seam weld 31. Similarly, the inner wall of the channel as 32, which is extended laterally of the main body of the door the same depth as the arm 28 of the angle 25, is secured by a continuous line or seam weld 33 to the arm 28. The rubber gasket 30 is held in this channel by any suitable means. In the present instance such means comprises an angle 34 having one arm overlapping and spot welded to the outer side wall of the channel, and the other and shorter arm overlapping the rubber gasket along the outer edge thereof. The inner edge of the gasket is held in place by a similar angle 35 which may be removably secured to the laterally extending flange 28, 32 by a bolted connection 36.

The channel 29 is difficult to form in one piece out of stainless steel and for convenience of manufacture it is preferably formed by the two angles 37 and 38 having two of their arms overlapped to form the bottom wall of the channel and secured together by a continuous seam weld 39 to form a water-tight joint. The overlapping arm of the outer of these channels is relatively shallow and is extended inwardly by a flat strip 40 providing with the arm a wide overlap with the outwardly extended portions of the corrugated plates 12, 15 and 17 which overlie the channel and reinforce the edge of the door.

The outer face plate 10 of the door is additionally reinforced at certain locations in its margins by relatively thick plates 41 and 42 which provide additional reinforcements at the location of the hinges 43 and clamping means as 44, for clamping the door to its seat against the flanges 14 on the frame surrounding the door opening. The reinforcements 41 and 42 are for ease of assembly, each divided into outer and inner portions as indicated by the line 45, see Fig. 1.

The door as hereinbefore described, is readily assembled in the following order. The inner corrugated plates 10 and 12 are first assembled by spot welding them together through their overlapped areas. The outer plates 10 and 11 are then brought in position on opposite faces of the assembled plates 12 and 13 and assembled thereto by sliding a copper core indicated in dotted lines by the numeral 45 into the hexagonal spaces between the plates 12 and 13 and simultaneously spot welding each outer plate to the adjacent corrugated plate by bringing the welding electrodes 46 and 47 into firm engagement with the opposite sides of the door and pressing the overlapped portions on the opposite sides of the door into firm engagement with the copper core and then passing the welding current. Reinforcing plates 19 and 20 overlapping the ends of the corrugated plates 12 and 13 are then welded in place through the overlapping portions of plates 10 and 12 and 11 and 13. The angle 25 is however seam welded to the margin of the inner plate 11 prior to its assembly with the plate 13. Plates 15 and 16 and 17 and 18 which have previously been welded together in a manner similar to the joinder of the plates 12 and 13 are then telescoped between the ends of the plates 10 and 11 and secured to those plates and to the overlapping portions of the reinforcing plates 19 and 20 in the manner already described in connection with the corrugated plates 12 and 13. The marginal reinforcements 20 and the portions of the reinforcements 42 and 43 located inwardly of the line 45, Fig. 1, are then welded in place by spot welding to the overlapped edge portions of the flat and corrugated plates 10 and 12. The next step in the assembly is the continuous seam welding of the angle 22 to the overlapped marginal portions of the outer face plate 10 and its edge reinforcing plate 20. The marginal portions of the reinforcements 41 and 42 located outwardly of the line 45, Fig. 1, are then brought in place and spot welded to the multi-thickness edge portion 23, 10, 20. Finally the channel 29 which had previously been preassembled in the manner already described is brought in place between the flange 24 and the flange 28 and continuously seam welded through its opposite side walls to those flanges. The outer rubber gasket retaining angle 34 is then spot welded in place, the rubber gasket inserted, and finally the inner retaining angle 35 is brought in place and bolted in position.

By the foregoing description it will be seen that there is provided a door construction which can be fabricated entirely out of relatively light gauge material in such a manner as to give it great strength and in such a manner as to facilitate its fabrication by spot and seam welding operations. Such a door not only provides a great saving in weight, which is an important consideration in naval construction, since it permits the carrying of a larger useful load, but a door constructed out of the materials and in the manner specified is substantially proof against corrosion which is another point in its favor in ships' constructions where the conditions tending toward corrosion are severe.

While there has been described a specific door construction which is considered very practical in form, it will be understood that changes and modifications may occur to those skilled in the art, and such changes and modifications are intended to be included within the spirit and scope of the invention as expressed in the following claims.

What we claim is:

1. A door construction comprising a main body fabricated out of inner corrugated plates, the corrugations of which overlap and are secured together, and outer flat plates forming the outer faces of the door, one on each side of the door, secured to corrugated plates in their overlapped areas.

2. A door construction comprising a laterally facing edge channel adapted to receive a sealing gasket, the main body of the door including corrugated plates having the bottoms of their corrugations overlapping and secured together, one of said corrugated plates terminating short of the edge channel and the other being extended thereover to reinforce the same.

3. A door construction comprising a main body fabricated out of inner corrugated plates, the corrugations of which have substantially rectilinear side and bottom walls, and the bottom walls of the corrugations of the plates overlapping and secured together, and flat cover plates forming the outer faces of the door overlapping the flat outer walls of said corrugated plates and secured thereto.

4. A door construction having a laterally facing edge channel adapted to receive a sealing gasket, the body of said door comprising corrugated plates having their bottom walls overlapping and secured together, one of said plates terminating short of the channel and the other being extended thereover to reinforce the same, the corrugations of said extended plate extending at substantially right angles to the edge of the door.

5. A door construction comprising a continuous laterally facing edge channel adapted to receive a sealing gasket, the body of the door comprising a pair of corrugated plates having their corrugations extending in the direction of one dimension of the door, said corrugations overlapping and being secured together in the overlapped areas, said corrugated plates terminating short of the other dimension of the door, the main body of the door beyond said first-named corrugated plates comprising corrugated plates having their corrugations extending at right angles to the corrugations of the first mentioned plates, the plates themselves extending from the first mentioned plates to the margins of the door, the corrugated plates adjacent the side of the door toward which the edge channel faces being terminated short of said edge channel, and the corrugated plates adjacent the opposite face of the door being extended in their margins into overlapping relation with the edge channel and reinforcing the same throughout.

6. A door construction having a continuous laterally facing edge channel adapted to receive a gasket, the body of said door comprising corrugated plates secured together at the bottoms of their corrugations and continuous flat cover plates on both sides of the door secured to said corrugated plates in their overlapped regions, the corrugated and flat plates adjacent one face of the door terminating at the channel and the corrugated and flat plates at the other face of the door being extended across the channel, the continuous flat plate at the last-named face of the door extending some distance beyond the corrugated plate, its outer edge being substantially in transverse alignment with the outer wall of the channel, an angle member extending continuously around the edge of the door and having one arm connected by a continuous seam weld to said extended portion of the cover plate and the other arm overlapping and connected by a continuous seam weld to the outside side wall of the channel, a second continuous angle member of substantially the peripheral dimensions of the inside wall of the channel having one arm overlapping the other cover plate and secured thereto by a continuous seam weld, and its other arm overlapping the inside side wall of the channel and secured thereto by a continuous seam weld, and a continuous gasket seated in said channel whereby the inside of the door is sealed throughout against the entrance of water.

7. A door construction having its main body built up out of continuous flat plates on the opposite sides of the door, and spacing means arranged between and secured to said flat plates, a continuous laterally facing channel adapted to receive a gasket at the margin of said door body, said channel having its inner wall extended laterally of the body of the door, the flat plate on the face of the door toward which said channel faces terminating at the inner side wall of the channel, the flat plate on the opposite face of the door being extended substantially to the outer side wall of the channel, and continuous angle members each continuously line welded through one arm to the edge of the adjacent cover plate and through the other arm to the adjacent side wall of the channel, and a continuous rubber gasket seated in said channel, whereby the hollow door structure is rendered impervious to the entrance of water throughout.

8. A hollow door construction, the opposite sides of which comprise continuous plates spaced substantially throughout by cellular spacing means and secured thereto, the plate on one side of the door terminating short of the plate on the other side of the door throughout the margin thereof, a continuous edge channel adapted to receive a gasket disposed outside the margin of the plate on one side of the door and having its inner side wall laterally extended from the face of the door and continuous angle members secured respectively through one of their arms with the margins of said plates and with the other of their arms with the adjacent side walls of the channel to form a water-tight joint, and a gasket seated in the channel, whereby the hollow interior of the door is sealed throughout against the entrance of water.

9. A hollow door construction fabricated on opposite sides of its median plane out of flat outer plates providing the faces of the door and corrugated reinforcing plates secured respectively to flat plates and to each other, the corrugated reinforcing plates and the flat plate adjacent one face of the door being marginally extended and a continuous laterally facing channel seated against said overlap and adapted to receive a sealing gasket, each of said outer plates being connected with one of the side walls of said channel to form a water sealed joint between the flat plates and the side walls of the channel.

10. A door construction having rounded corners and built up of light gauge sheet metal parts including flat plates on the opposite face thereof, one of said plates being extended beyond the other, a continuous laterally facing channel adapted to contain a sealing gasket being secured to the margins of said flat plates to form a water tight joint therewith, an edge reinforcement secured to the outer face of the flat plate on the side opposite said channel, an upstanding flange around the edge of the door opening and arranged to engage the gasket in said channel when the door is closed, and means for clamping the door in place with the upstanding flange pressed into the gasket and forming a seal all around the margin of the door.

11. A door construction having its main body built up out of continuous flat plates on the opposite sides of the door, and spacing means arranged between and secured to said flat plates, a continuous laterally facing channel adapted to receive a gasket at the margin of the door body, said channel having its inner wall extended laterally of the body of the door, the flat plate on the face of the door toward which said channel faces terminating at the inner side wall of the channel in a flanged edge extension overlapping the inner side wall of the channel, the flat plate on the opposite face of the door being extended substantially to the outer side wall of the channel, and extended in its margin by a laterally extending door edge flange overlapping the outside side wall of the channel, the outer and inner side walls of the channel being continuously line welded to the overlapping lateral edge extensions of said flat plates on the opposite side of the door to form water-tight joints therewith.

12. A door construction having its main body built up out of continuous flat plates on the opposite sides of the door, and spacing means arranged between and secured to said flat plates, a continuous laterally facing channel adapted to receive a gasket at the margin of the door body, said channel having its inner wall extended laterally of the body of the door, the flat plate on the face of the door toward which said channel faces terminating at the inner side wall of the channel in a flanged edge extension overlapping the inner side wall of the channel, the flat plate on the opposite face of the door being extended substantially to the outer side wall of the channel, and extended in its margin by a laterally extending door edge flange overlapping the outside side wall of the channel, the outer and inner side walls of the channel being continuously line welded to the overlapping lateral edge extensions of said flat plates on the opposite side of the door to form water-tight joints therewith, the channel being built up of two continuous angles having two arms overlapping and joined together by a continuous line weld forming a water-tight joint.

MARCUS B. BUTLER, Jr.
CHARLES B. CONWELL.